United States Patent
Dahan et al.

(10) Patent No.: US 8,660,426 B2
(45) Date of Patent: Feb. 25, 2014

(54) OPTICAL SIGNAL TO NOISE RATIO MONITORING TECHNIQUE AND SYSTEM

(75) Inventors: David Jimmy Dahan, Tel-Aviv (IL); Uri Mahlab, Or Yehuda (IL); David Levy, Shoham (IL)

(73) Assignee: ECI Telecom Ltd., Petach-Tikva (IL)

( * ) Notice: Subject to any disclaimer, the term of this patent is extended or adjusted under 35 U.S.C. 154(b) by 131 days.

(21) Appl. No.: 13/321,545

(22) PCT Filed: May 30, 2010

(86) PCT No.: PCT/IL2010/000428
§ 371 (c)(1),
(2), (4) Date: Nov. 19, 2011

(87) PCT Pub. No.: WO2010/150241
PCT Pub. Date: Dec. 29, 2010

(65) Prior Publication Data
US 2012/0063772 A1      Mar. 15, 2012

(30) Foreign Application Priority Data
Jun. 23, 2009 (IL) .......................................... 199508

(51) Int. Cl.
*H04B 10/08* (2011.01)
*H04B 17/00* (2006.01)

(52) U.S. Cl.
USPC ............................................ 398/26; 398/33

(58) Field of Classification Search
None
See application file for complete search history.

(56) References Cited

U.S. PATENT DOCUMENTS

| | | | | |
|---|---|---|---|---|
| 7,756,369 | B2 * | 7/2010 | Rudolph et al. | 385/24 |
| 7,953,328 | B2 * | 5/2011 | Tao et al. | 398/198 |
| 2010/0178052 | A1 * | 7/2010 | Eggleton et al. | 398/26 |
| 2010/0322622 | A1 * | 12/2010 | Shukunami et al. | 398/26 |

FOREIGN PATENT DOCUMENTS

WO    WO 2008/151384 A1    12/2008

OTHER PUBLICATIONS

In-Band OSNR Monitoring Technique Based on Link-by-Link Estimation for Dynamic Transparent Optical Networks, Journal of Lightwave Technology, vol. 26, No. 10, May 15, 2008.*
Agilent 71400 Lightwave Signal Anaylzer Application Note 371 (Measurning modulated light).*
T. B. Iredale, M. Pelusi and B. J. Eggleton, "All-optical in-band OSNR monitoring at 160Gb/s using non-linear optical loop mirror" COIN—ACOFT 2007, pp. 1-3.
T. B. Iredale, M. Pelusi and B. J. Eggleton, "Highly-sensitive all-optical in-band OSNR monitor using stimulated Brillouin scattering" COIN—ACOFT 2007, pp. 1-3.

(Continued)

*Primary Examiner* — Ken Vanderpuye
*Assistant Examiner* — Mina Shalaby
(74) *Attorney, Agent, or Firm* — Novick, Kim & Lee, PLLC; Harold L. Novick; Jae Youn Kim

(57) ABSTRACT

For determining $OSNR_{real}$ of a real optical signal carried in an optical network link, the following has been proposed: tapping a portion of the real optical signal, altering the tapped signal portion by adding to it in-band artificial noise signal, thus obtaining a combined signal, scattering the combined signal by stimulated Brillouin or Raman scattering (SBS or SRS) in an optical element, extracting a signal back reflected by SBS/SRS from the optical element, determining $OSNR_{comb}$ of the back reflected signal and deriving the $OSNR_{real}$ from the $OSNR_{comb}$ knowing absolute and/or relative power of the added artificial noise.

9 Claims, 10 Drawing Sheets

(56) References Cited

OTHER PUBLICATIONS

D.C. Kilper, R. Bach, D.J. Blumental, D. Einstein, T. Landolsi, L. Olstar, M. Preiss and A.E Willner, "Optical performance monitoring", J. of Lightwave. Technology. vol. 22, No. 1, pp. 294-304, 2004.

G. Rossi, T. E Dimmick and D.J. Blumenthal, "Optical performance monitoring in reconfigurable WDM optical networks using subcarrier multiplexing", J. of Lightwave Technology, vol. 18, No. 12, pp. 1639-1648, 2000.

J. H. Lee, D. K. Jung, C. H. Kim and Y. C. Chung, "OSNR monitoring technique using polarization-nulling method" IEEE Photonics Technology letters, vol. 13, No. 1, pp. 88-90, 2001.

X. Liu, Y.-H. Kao, S. Chandrasekhar, I. Kang, S. Cabot, and L. L. Buhl, "OSNR Monitoring Method for OOK and DPSK Based on Optical Delay Interferometer", IEEE Photonics Technology letters, vol. 19, No. 15, pp. 1172-1174, 2007.

T.T. Ng, J.L. Blows, M. Rochette. J.A. Bolger, I. Littler and B. J. Eggleton, "In band OSNR monitoring and chromatic dispersion monitoring using a fiber optical parametric amplifier", Optics Express, vol. 13, No. 14, pp. 5542-5552, 2005.

R. Adams, M. Rochette, T.T. Ng and B.J. Eggleton, "All optical In-band OSNR monitoring at 40 Gb/s using Nonlinear optical loop mirror", IEEE Photonics Technology Letters, vol. 18, No. 3, pp. 469-471, 2006.

M.J. Damzen, V. Vlad, A. Mocofanescu and V. Badin, Summary page of "Stimulated Brillouin Scattering: Fundamentals and Applications", Institute of Physics, Series in Optics and Optoelectronics (CRC Press, 2003).

International Search Report mailed Oct. 12, 2010 in International Application PCT/IL2010/000428, filed May 30, 2010.

\* cited by examiner

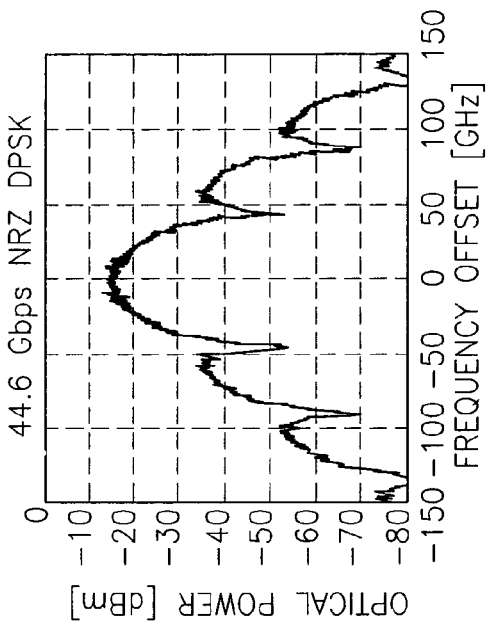
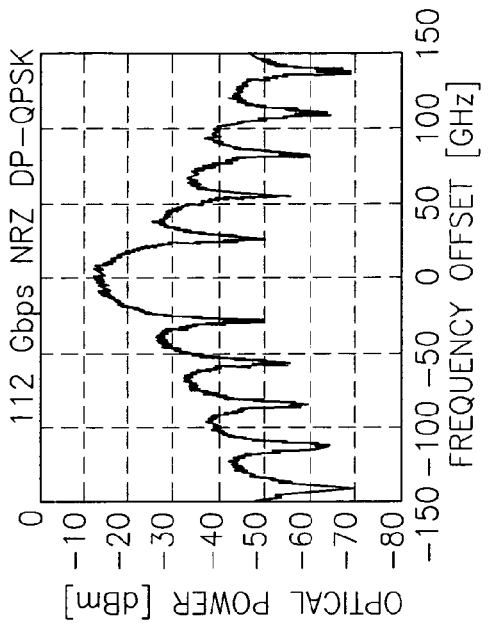
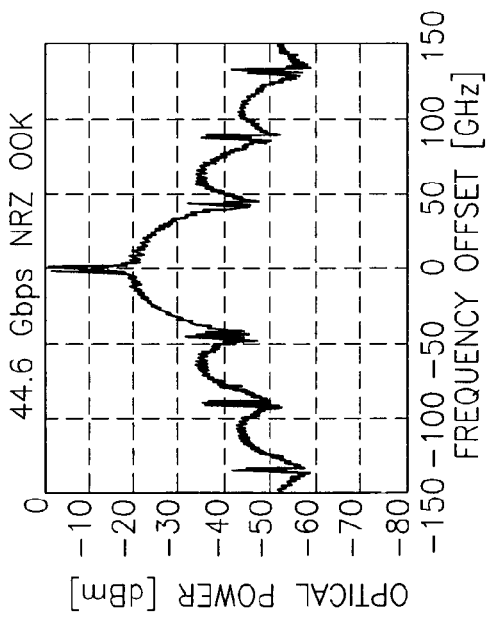
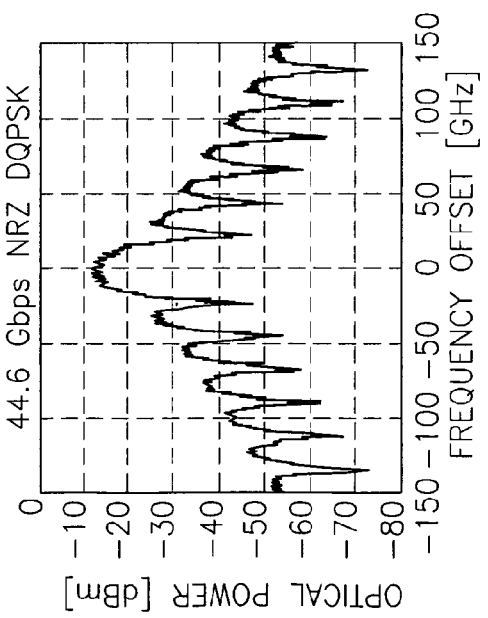

44.6 Gbps NRZ DPSK
100 GHz SPACING 44.6 Gbps NRZ DPSK
50 GHz SPACING

| ○ OPcNR=50dB (prior art) | ◇ OPcNR=10dB | △ OPcNR=6dB | × OPcNR=3dB |
| □ OPcNR=16dB | △ OPcNR=8dB | ✽ OPcNR=4dB | |

44.6 Gbps NRZ DPSK
100 GHz SPACING 44.6 Gbps NRZ DPSK
50 GHz SPACING

| ○ 15–35 dB | □ 15–20 dB | ◇ 20–25 dB | △ 25–35 dB |

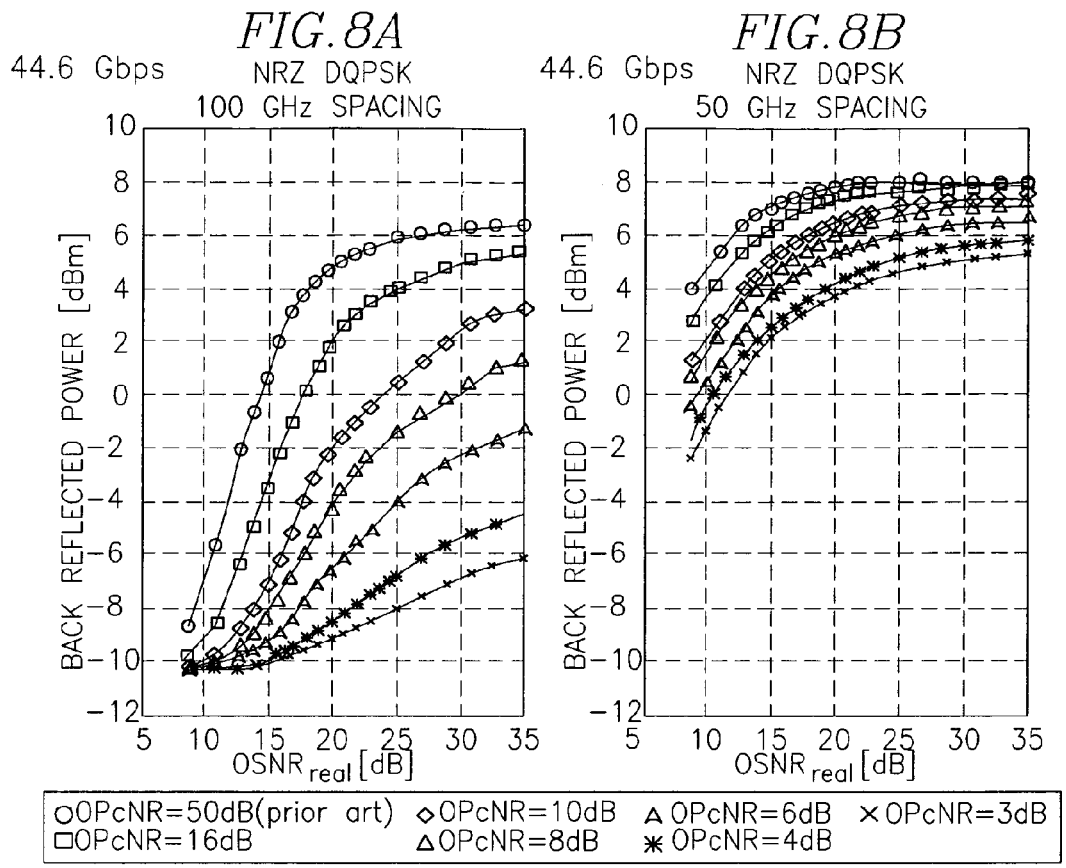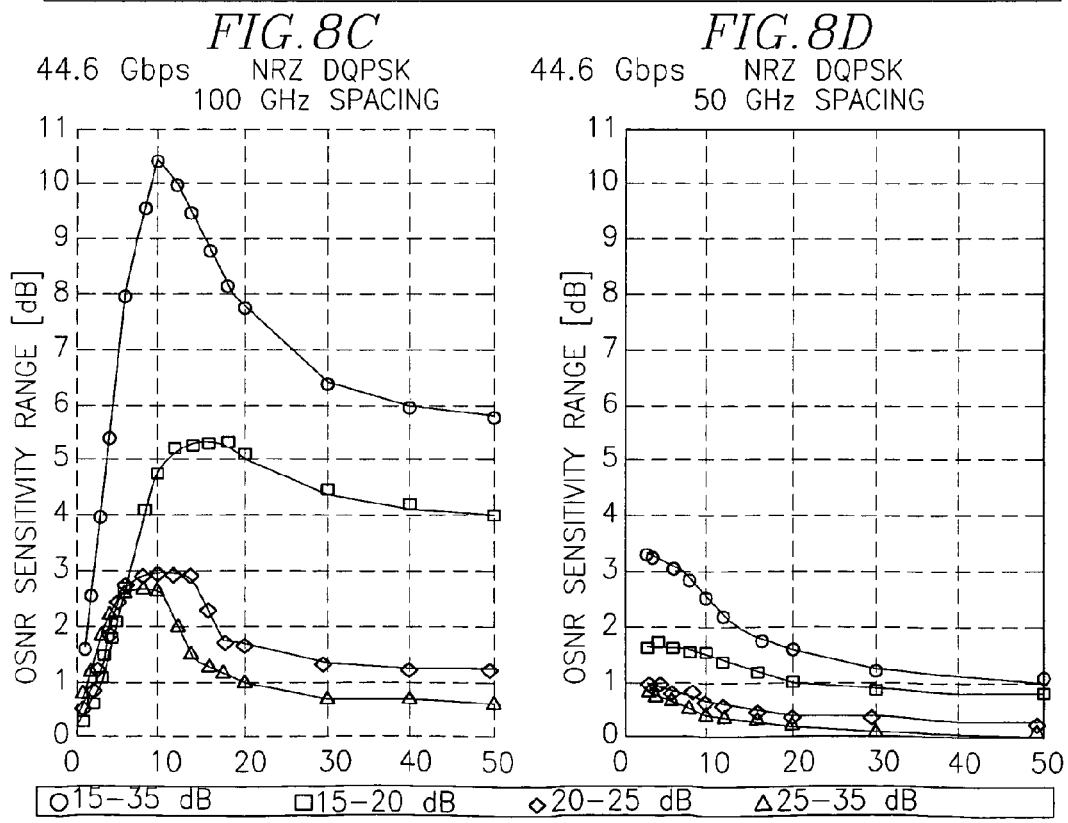

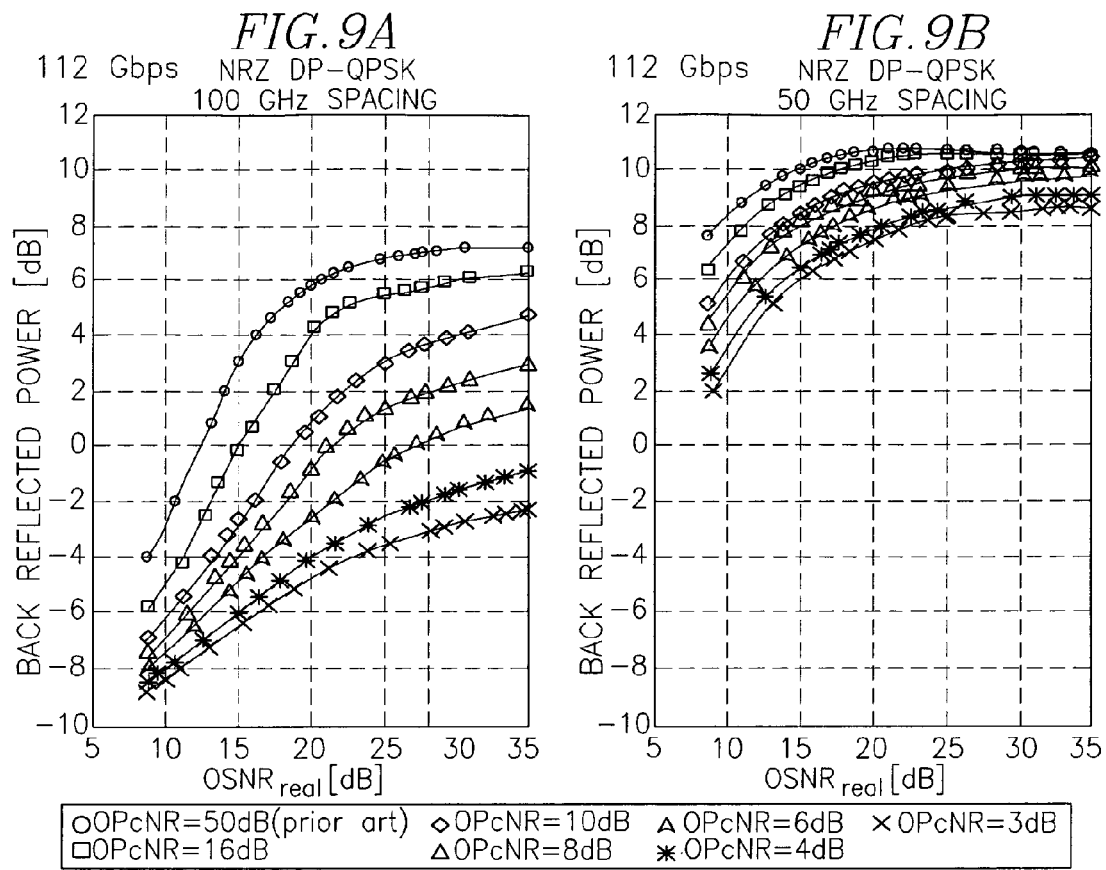

OPTICAL SIGNAL TO NOISE RATIO MONITORING TECHNIQUE AND SYSTEM

FIELD OF THE INVENTION

The present invention relates to technology for Optical Signal to Noise Ratio (OSNR) monitoring, based on non-linear scattering of optical signals, and especially to technology enabling such performance monitoring in modern high speed (high bit rate) systems.

BACKGROUND OF THE INVENTION

Deployment of high speed transparent and reconfigurable optical networks requires effective flexible and robust Optical Performance Monitoring (OPM) techniques for ensuring high quality of service. The modern high speed networks are susceptible of optical signal degradations, mainly due to the Amplified Spontaneous Noise (ASE) from the optical amplifiers. Real time monitoring of the OSNR is a requirement in order to ensure the signal quality and in order to monitor potential failures in the transmission link.

The most common method to monitor the OSNR is based on the spectral analysis of the Transmission WDM signals and derives the OSNR by interpolating the out of band noise level into the signal band, namely by estimating the in-band noise level using the out of band noise level [D. C. Kilper, R. Bach, D. J. Blumental, D. Einstein, T. Landolsi, L. Olstar, M. preiss and A. E Willner, "Optical performance monitoring", J. Lightwave. Technology., vol 22, no 1, pp 294-304, 2004]. However such a technique suffers from the use of optical filtering and routing in the link path since the out of band noise must be filtered out and therefore the interpolating method leads to severe underestimates of the real OSNR level.

Methods to derive OSNR level by estimating the in band noise level directly, even in the presence of optical filters in the link, are referred as "true OSNR" methods. Several true OSNR methods [for example, G. Rossi, T. E Dimmick and D. J Blumenthal, "Optical performance monitoring in reconfigurable WDM optical networks using subcarrier multiplexing", J. Lightwave Technology, vol. 18, n12, pp 1639-1648, 2000] have been proposed and are based on various approaches such as electrical carrier to noise monitoring, polarization nulling, optical delay interferometer, nonlinear transfer functions using an optical parametric amplifier, a nonlinear loop mirror. Some of these methods are sensitive to other system impairments such as Chromatic Dispersion (CD) and Polarization Mode Dispersion (PMD). and this makes the OSNR monitoring more challenging. Relevant references are presented at the end of the description.

A method of True OSNR monitoring technique based on Stimulated Brillouin Scattering (SBS) effect [WO 2008151384 A1], has an advantage in that it is insensible to CD and PMD. The SBS effect [M. J Damzem, V. Vlad, A Mocofanescu, V. Badin, "Stimulated Brillouin Scattering: Fundamentals and Applications", Institute of Physics, Series in Optics and Optoelectronics (CRC Press, 2003)] is a spectral nonlinear effect which leads to the nonlinear power transfer from the signal spectral component to a Stoke wave (down shifted in frequency with respect to the signal frequency) propagating in the backward direction with respect to the signal. The OSNR technique based on the SBS effect uses the fact that when a signal has its higher spectral components above the SBS threshold, the efficiency of the power being transferred to the Stoke wave is altered by the noise present within the signal band.

The noise being present within an optical signal in a real optical system (such as an optical link) is the so-called Amplifier Spontaneous Emission (ASE) noise being introduced by optical amplifiers which form part of the optical link. FIG. 1 of the WO 2008151384 is demonstrated as FIG. 1a (prior art) of the present patent application. FIG. 1a schematically illustrates the ASE noise, being always present within a real optical signal, as a noise source 22 which introduces a variable value of noise to a pure optical signal produced by an optical signal source 20. The resulting optical signal is then fed to an SBS based OSNR monitor 10.

WO 2008151384 further demonstrates results of the SBS based OSNR technique for 40 Gbps NRZ (Non return to Zero) OOK (On-Off Keying) signal, which presents dynamic OSNR monitoring range of 15 dB for OSNR from 15 to 30 dB. Quite high sensitivity (15 dB) is demonstrated due to the fact that the 40 Gbps NRZ OOK signal spectrum presents a prominent spectral peak at the carrier wavelength which is sufficiently narrow to stimulate an efficient SBS effect. The efficiency is also enhanced by the fact that the inventors of WO 2008151384 use a broadband bandpass filter (1 nm bandwidth) which, however, is not compliant with operations with 100 GHz and 50 Ghz channel spacing. Moreover, the NRZ OOK modulation format presents severe system penalties for bit rates of 40 to 100 Gbps; phase modulation formats are preferred and are optionally combined with polarization multiplexing scheme for additional CD and PMD impairment relaxations. Furthermore, with the network operating at 40 and 100 Gbps, and with utilizing the modulation formats such as DPSK (Differential phase shift keying), DQPSK (Differential Quaternary Phase Shift Keying) and DP-QPSK (Dual Polarization Quaternary Phase Shift Keying), OSNR requirements become stronger and the network links should be planned to meet OSNR of 15 dB and higher at the link end.

A real optical system such as a network link or the like, in order to be practically useful for carrying high bit rate optical signals, must have OSNR higher than 15 dB (i.e., must have a low in-band ASE noise level). Therefore, the optical signal carried through such an optical link cannot cause a significant change in the SBS induced reflected power. Due to that, the OSNR monitoring sensitivity range of the apparatus described in WO 2008151384 A1 will be drastically limited when applied to real modern optical systems. It should be further noted that when the channel grid in such optical systems is limited to 50 GHz, the amount of in band noise should be even more reduced. It means that for the spacing of 50 GHz, the sensitivity of the WO 2008151384 apparatus becomes totally unacceptable.

However, WO 2008151384 describes a set-up for measuring/monitoring OSNR in real optical systems (FIG. 4), which is reproduced in the present application as FIG. 1B. The optical signal 42 comprising in band noise is transmitted via an optical network link 44 and is tapped from it to the SBS based OSNR monitor 10.

Upon analyzing the sensitivity of the real system set-up of WO 2008151384 A1, that set-up occurs to be:

a) ineffective (having low sensitivity) for monitoring signals with relatively high OSNR which is the condition for optical links at high bit rates (i.e., 40 Gbps and higher);

b) practically inapplicable for modulation formats other than NRZ OOK, which are more preferable than NRZ OOK for the high bit rates.

Therefore an OSNR monitoring technique is required, which would ensure a sufficient dynamic monitoring range for OSNRs ranging from 15 to 30 dB.

OBJECT AND SUMMARY OF THE INVENTION

It is an object of the present invention to propose a novel method and a novel apparatus for true OSNR monitoring in optical network, compliant to very high bit rates and various modulation formats, and with the ability to increase and tune the OSNR sensitivity range.

The above object can be achieved by providing a technique that utilizes a known SBS effect in an optical fiber, but is modified in a way which will be described The Inventors have also noted that another similar nonlinear effect, named Simulated Raman Scattering (SRS), can be used to scatter the optical signal.

According to a first aspect of the invention, there is provided an OSNR monitor for monitoring OSNR ($OSNR_{real}$) of a real optical signal being carried in an optical network link and including in-band ASE noise, the monitor comprising:

a receiver for receiving at least a portion of said real optical signal from said real link, a source of artificial noise, for adding to said portion of the real optical signal an artificial noise signal to increase in band noise of said real optical signal portion, a coupling device for coupling said at least a portion of the optical signal and said artificial noise signal thus obtaining a combined signal, an optical element to scatter said combined signal by stimulated Brillouin or Raman scattering;

a device for extracting a reflected optical signal comprising a portion of said combined optical signal back-reflected by stimulated Brillouin or Raman scattering in said optical element;

a photodetector for receiving and measuring power of said reflected optical signal;

a processing unit for determining $OSNR_{real}$ of the real optical signal, wherein said processing unit being adapted to determine $OSNR_{comb}$ of the combined optical signal based on power of the reflected optical signal, and adapted for deriving $OSNR_{real}$ from the $OSNR_{comb}$ by taking into account information (an absolute and/or a relative value) on power of the added artificial noise.

Preferably, the monitor comprises means (such as one or more variable optical amplifiers, VOA) for regulating power of said portion of the real optical signal and/or said artificial noise signal.

The absolute information on the artificial noise added to the optical signal is its power Padd, and the relative information on the added artificial noise is actually OPcNR which is Padd/(Pc=Ps+Pn), wherein Pc is power of the composite optical signal (including its initial inband noise Pn), tapped from the optical network.

Further preferably, the monitor (for example, its processing unit) can be adapted to enable (say, to recommend by some indication) selection of such a proportion of the optical signal power and the added artificial noise power (i.e., such OPcNR), which ensures maximally increasing sensitivity of the optical element (and the monitoring).

In the preferred embodiment, the monitor also comprises an amplifier to amplify the combined signal to a desired/suitable amount of power to be launched to the optical element. That power can also be automatically registered and controllable by the processing unit.

It should be kept in mind that one of the main challenges for generating SBS effect for DPSK/DQPSK/DP-QPSK signals is the fact that a higher launched power is required (compared, say, to conventional NRZ OOK signals).

In order to produce the higher output power using a conventional optical amplifier, the monitor (i.e., its control and processing unit) may be adapted to provide amplification of the combined signal only during a fraction noted [0 to TS] of its time frame TM, while ensuring that the signal is switched off during its complementary fraction [TS to TM]. For example if the signal is switched on during 10% only of its time frame (TS/TM=0.1), the instantaneous output power after the amplifier will be increased by ×10 during the time period [0 to TS].

It should be noted that the proposed OSNR monitor has proven as highly sensitive in monitoring OSNR of high bit rate optical signals (40 Gbps and higher), with channel spacing of 100 GHz, 50 GHz or less and for various modulation formats. However, the highly sensitive monitor can also be successfully used at low bit rates and at such conditions where other prior art techniques are ineffective: for example at 2.5 Gbps, 10 Gbps, 20 Gbps, but for very small channel spacing like for example 25 GHz or 12.5 GHz.

The applicable modulation formats are, for example, OOK (On-Off Keying), [D]PSK ([Differential] phase shift keying), [D]QPSK ([Differential] Quaternary Phase Shift Keying), OFDM (Orthogonal Frequency Division multiplexing), QAM (Quadrature Amplitude Modulation), DuoBinary, SSB (Single Side Band) modulation. Both NRZ and RZ optical line coding of the above modulations formats are applicable, as well as the Dual Polarization version of these modulation formats.

The Inventors further propose an equation for obtaining a value of the OSNRreal based on the value of reflected portion of the combined (distorted) signal, which will be disclosed and explained in the detailed description.

The artificial noise source can be any suitable device, for example an optical amplifier (SOA, EDFA) with or without an input signal.

According to a second aspect of the invention, there is also provided a method of determining a real OSNR ($OSNR_{real}$) of a real optical signal being carried in an optical network link, by tapping a portion of the real optical signal, altering (distorting) the tapped signal portion by adding to it at least in-band artificial noise, determining OSNRalt of the altered signal (the altered tapped portion) using a non-linear effect of SBS or SRS, and deriving the $OSNR_{real}$ from the OSNRalt knowing an absolute and/or a relative power value of the artificial noise added.

As has been discussed, the OSNRalt of the altered signal can be determined, for example, by scattering the altered signal portion by stimulated Brillouin scattering (SBS) in an optical element (SBS media) or by SRS in an SRS media, extracting a signal back reflected by SBS or SRS from the optical element, determining OSNRalt of the back reflected signal.

The altered signal is the combined signal mentioned above in the description of the proposed OSNR monitor; consequently, the OSNRalt is OSNRcomb.

Preferably, the method comprises regulating power of said portion of the real optical signal and/or power of said added artificial noise signal and selecting such a proportion therebetween which, maximally increases sensitivity of the optical element.

Also, the method preferably allows amplifying the combined (altered) signal to a desired amount of power before scattering to the optical element.

For example, amplifying of the combined signal may be performed during a fraction [0 to TS] of its time frame TM, by switching off said signal during its complementary fraction [TS to TM]. The time fraction for amplifying the signal may be selected to be from about 10% up to 100% of the time frame, thereby obtaining amplification by an order of magnitude during said time fraction.

In practice, some measurement/calculation inaccuracies of the OPcNR, OSNRcomb and also of the power launched (scattered) into the SBS media could lead to some errors in the estimation of the OSNRreal.

Therefore, it will be preferred to perform the method at two or more different levels of the artificial noise power (and/or the OPcNR levels). While each OPcNR level will give an estimated OSNRcomb value (and therefore an estimated OSNRreal value), the required OSNRreal level will be obtained as an average of the different estimated OSNRreal values provided by the two or more different OPcNR levels.

The above method allows increasing sensitivity when monitoring OSNR of real optical signals in real modern optical networks. For example, it enables highly sensitive monitoring of OSNRreal at conditions which are impossible for other prior art techniques, such as:
- at high bit rates not lower than 40 Gbps, carried in a WDM network, having channel spacing 100 GHz and smaller;
- at low bit rates, for example 2.5 Gbps, 10 Gbps, 20 Gbps, but for very small channel spacing like for example 25 GHz or 12.5 GHz.

The invention will be explained in more details as the description proceeds.

BRIEF DESCRIPTION OF THE DRAWINGS

The invention will be further described and illustrated with reference to the following non-limiting drawings, in which:

FIGS. 5A, 5B, 5C, 5D comprise the optical spectra of different modulation formats specifically considered in the present patent application: 44.6 Gbps NRZ OOK, 44.6 Gbps NRZ DPSK, 44.6 Gbps NRZ DQPSK and 112 Gbps NRZ DP-QPSK

FIGS. 8A, 8B show results of the numerical simulation of the back reflected power as a function of the real OSNR for 44.6 Gbps NRZ DQPSK signal; the simulation is conducted for several OPcNR levels and for the two cases of channel spacing—100 GHz and 50 GHz.

FIGS. 8D, 8C show the change in the OSNR monitoring sensitivity as a function of the OPcNR, for different OSNR monitoring ranges and for the same 44.6 Gbps NRZ DQPSK signal. The two figures respectively correspond to 100 GHz and 50 GHz channel spacing.

FIGS. 9A, 9B show results of the numerical simulation of the back reflected power as a function of the real OSNR for the optical signal of 112 Gbps, with NRZ DP-QPSK format, for several OPcNR levels and for the cases of 100 GHz and 50 GHz channel spacing.

FIGS. 9C, 9D show the change in the OSNR monitoring sensitivity as a function of the OPcNR, for different OSNR monitoring ranges of the 112 Gbps NRZ DP-QPSK signal, and presented for 100 GHz and 50 GHz channel spacing.

DETAILED DESCRIPTION OF THE INVENTION

Figure 1A:
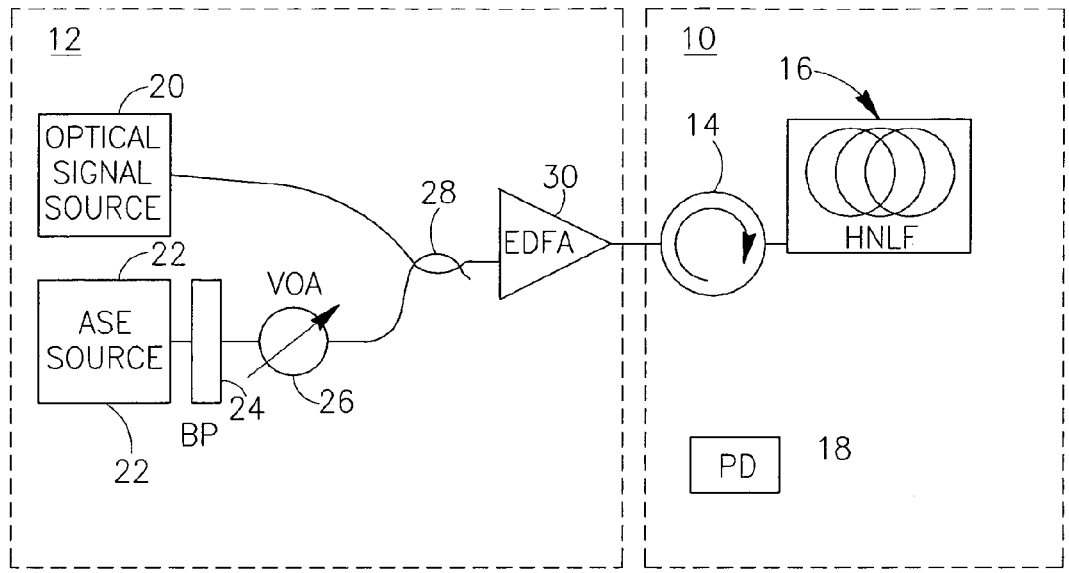
FIG. 1a (prior art) illustrates a known set-up of OSNR measurement based on the SBS (Brillouin scattering) effect in a highly nonlinear fiber.

FIG. 1a (prior art) schematically illustrates the ASE noise, being always present within a real optical signal, as a noise source 22 which introduces a variable value of noise to a pure optical signal produced by an optical signal source 20. The resulting optical signal is then fed to an SBS based OSNR monitor 10. FIG. 1a illustrates the principle of the SBS-based noise monitoring, namely—the character of the Stimulated Brillouin Scattering of an optical signal reacts to presence of in-band noise in the signal.

Figure 1B:
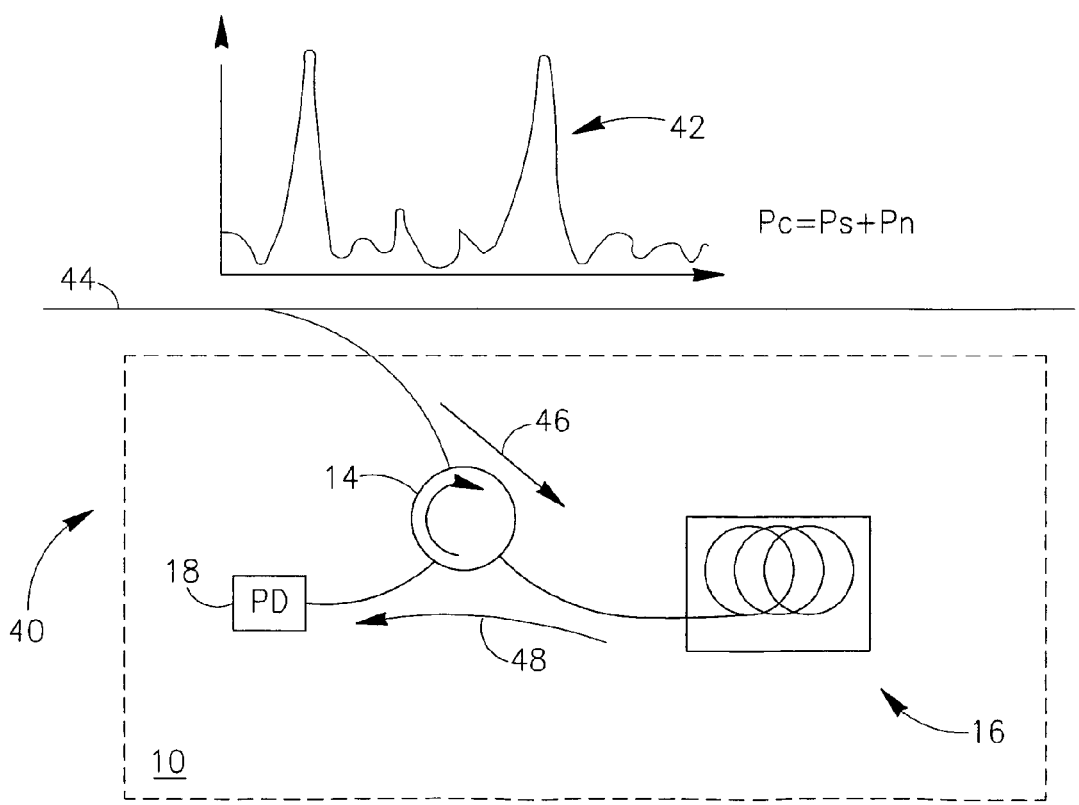
FIG. 1b (prior art) illustrates a prior art set-up for measuring OSNR of a real optical signal carried by an optical link.

FIG. 1b (prior art) illustrates a prior art arrangement 40 for true OSNR measurement of a real optical signal, based on the SBS effect. The optical signal 42 comprising its in band noise is transmitted via an optical network link 44 and is tapped there-from to the SBS based OSNR monitor 10.

A power fraction of the optical signal 42 (say, comprising one exemplary channel to be monitored) from the link 44 exhibits a composite power, noted $P_c$, which is composed from the signal power, noted Ps and the in band noise power, noted $P_n$. The signal composite power ($P_c=P_s+P_n$) is amplified (not shown) and launched into a medium 16 creating the enhanced SBS effect. This medium can be a highly nonlinear fiber (HNLF) or crystal or nonlinear planar integrated waveguide. The signal is sent into the nonlinear SBS medium with a known fixed optical power. When the signal's OSNR is high, the launched power is sufficiently high above the SBS threshold to lead to a significant SBS induced back-reflected power which is measured using an optical circulator 14 and the photo diode 18. For the same given launched power, when the signal OSNR is low, the amount of in band noise power reduces the power of the signal spectral components, which leads to a reduction of the SBS induced reflected power. The change in the back-reflected power is used to identify the OSNR of the signal being monitored.

However, due to the accepted design requirements to modern optical networks, the requested OSNR for 40 Gbps to 100 Gbps optical signal must be equal or better than 15 dB, which means that optical signals must have very low noise. Therefore, the in band noise power will be not high enough to produce significant changes in the SBS induced back-reflected power, especially for DWM system with 50 GHz channel spacing. This leads to a significant reduction of the OSNR monitoring sensitivity. Any practical implementation of the above-described set-up in real deployed optical networks is limited to low or medium bit rates (up to 10 Gbps). Relatively good sensitivity in the OSNR measurements for 40 Gbps NRZ OOK, mentioned in WO 2008/151384, could be obtained only due to quite a wide bandwidth filter (1 nm bandpass filter). In real networks, where the optical filter bandwidth is limited to 80 GHz (for 100 GHz channel spacing), the described set-up is non-satisfying.

Figure 2:
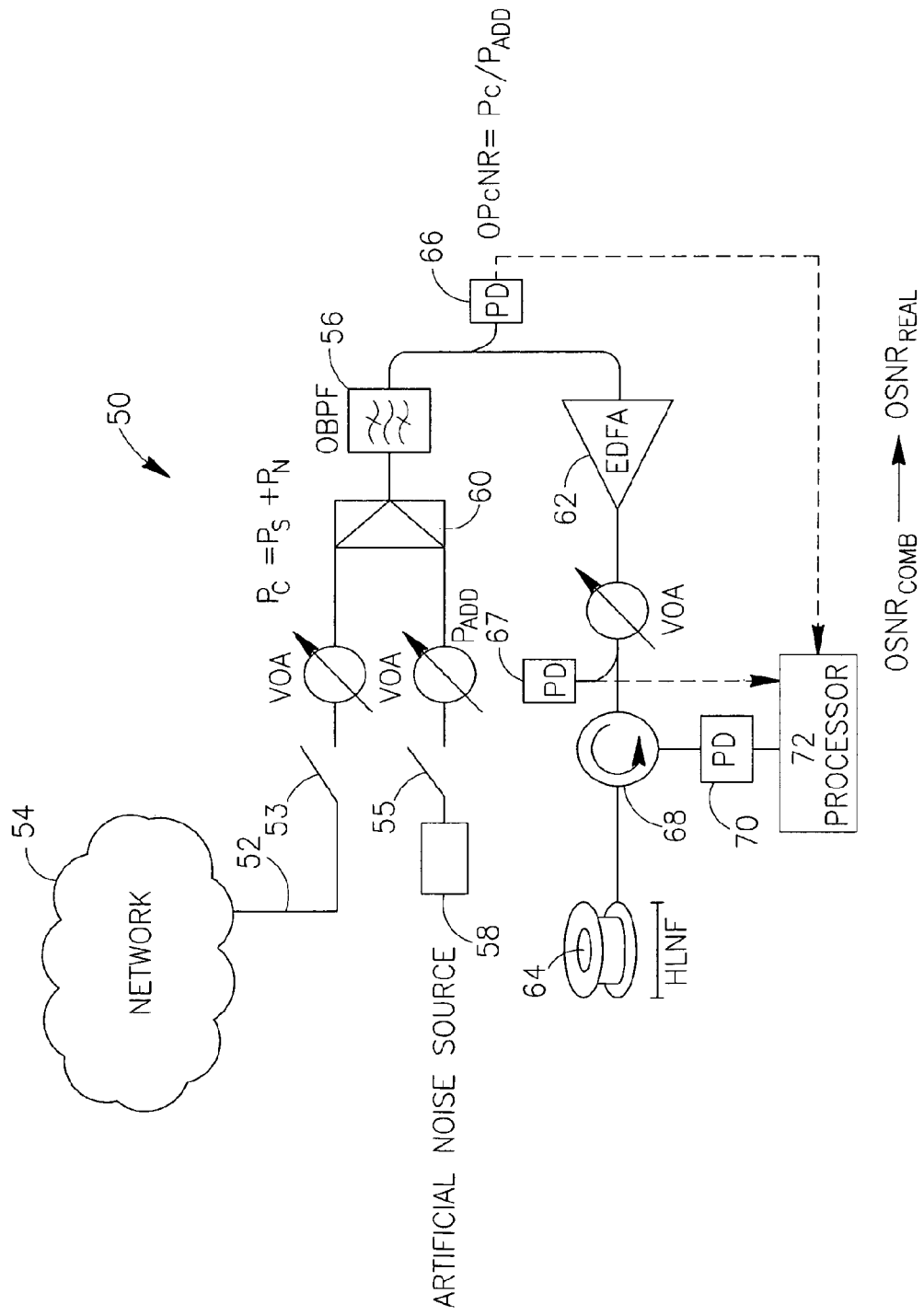
FIG. 2 schematically illustrates the presently proposed SBS-based OSNR monitor for monitoring real optical signals obtained from an optical network link; the inventive OSNR monitor comprises an additionally provided source of artificial noise and a processing unit for determining the real OSNR.

In order to improve the OSNR monitoring sensitivity, to adapt the technique to real conditions in modern optical networks and to various modulation formats of the signal, the Inventors propose a new OSNR monitor 50 shown in FIG. 2.

In FIG. 2, a power fraction of the real optical signal to be monitored is extracted from the network (like in FIG. 1b) by a tap and an optical filter in order to reject all but one DWDM optical channels.

A tap (not shown) derives a power fraction of the optical WDM signals 52 from a network 54, and an optical filter (can be filter 56) enables to select the signal to be monitored. The selected signal exhibits a composite power, noted $P_c$ composed by the signal power, noted Ps and the in band noise power, noted $P_n$.

The arrangement differs from that of FIG. 1b in that an artificial noise source 58 is added to the apparatus, to increase the existing in band noise power in the real optical signal by a known power amount, noted $P_{add}$. A combined optical signal is obtained using a coupler 60 and the filter 56.

The combined signal includes the composite power ($P_c = P_s + P_n$) and the added noise power $P_{add}$. It should be noted that in the set-up proposed by the Inventors, the initial optical signal can be almost totally distorted after adding the artificial noise, so that it would be impossible to judge about OSNR of the initial optical signal based only on the distorted signal. However, some measurements concerning the combined (distorted) signal can be performed and are performed using a photodiode 66 and then a photodiode 67 (will be described below).

The combined signal is then amplified by an amplifier 62 and launched into a medium 64 creating the enhanced SBS effect. The combined signal is sent into the nonlinear SBS medium with a known fixed optical power which can be measured by the photodiode 66 and/or (after amplifying) by a photodiode 67. The induced back-reflected power from the media 64 is measured using the optical circulator 68 and a photodiode 70. OSNR of the initial real optical signal is then derived by a processing block 72 from the measurements performed by photodiode 70, utilizing the measurements performed by photodiodes 66 and 67 (in particular, by knowing the power of added artificial noise).

More specifically, we can define the "Optical Power composite to Noise Ratio" (OPcNR) after adding the artificial noise, as a ratio between the composite Power $P_c$ of the optical signal and the introduced power $P_{add}$ of the artificial noise:

$$OPcNR = \frac{P_c}{P_{add}} = \frac{P_s + P_n}{P_{add}} = \left(OSNR_{real}\frac{B_{ref}}{B_{eq}} + 1\right)\left(\frac{P_n}{P_{add}}\right) \quad (1)$$

where the $OSNR_{real}$ is of the OSNR of the real optical signal defined as:

$$OSNR_{real} = \left(\frac{P_s}{P_n}\right) \times \left(\frac{B_{eq}}{B_{ref}}\right) \quad (2)$$

where $B_{eq}$ is the equivalent noise bandwidth of the filter used in the measurement and $B_{ref}$ is the reference noise bandwidth (usually $B_{ref}$=12.5 GHz).

Assuming the optical filter used to select the channel has a flat top profile, typical values of the coefficient $B_{eq}/B_{ref}$ are as follows for optical networks operating at 100 and 50 GHz channel spacing:

| Channel Spacing [GHz] | Typical $B_{eq}$ [GHz] | $B_{ref}$ [GHz] | $B_{eq}/B_{ref}$ |
|---|---|---|---|
| 100 | 80 | 12.5 | 6.4 |
| 50 | 45 | 12.5 | 3.6 |

Upon adding the artificial noise, OSNR of the combined signal becomes lower, and gets to a level $OSNR_{comb}$ which is defined as:

$$OSNR_{comb} = \left(\frac{P_s}{P_n + P_{add}}\right) \times \left(\frac{B_{eq}}{B_{ref}}\right) < OSNR_{real} \quad (3)$$

For a given optical launched power (which can be regulated), the apparatus provides a suitable given amount of reflected power which is correlated to the $OSNR_{comb}$.

The photo diode PD 70 measures the back reflected power and, based on it, the processor unit 72 is able to determine the OSNRcomb according to a lookup table of the reflected power as a function of the launched optical power (data is received from PD 67, see a dashed arrow) and the modulation format.

Knowing the level of $OSNR_{comb}$, and knowing the OPcNR (the measurements before and after adding the artificial noise are performed at PD 66, and then fed to processor 72—see another dashed arrow from 66 to 72), the true value of the signal OSNR ($OSNR_{real}$) can be obtained at the block 72 using equations (1) to (3) or just the following equation (4):

$$OSNR_{real} = OSNR_{comb} \times \frac{OPcNR + 1}{\left(OPcNR - OSNR_{comb} \times \left(\frac{B_{ref}}{B_{eq}}\right)\right)} \quad (4)$$

To ensure determining of OPcNR, the proposed apparatus comprises optical switches: 53 at the real signal port of coupler 60, and 55 at the "artificial noise" port. The photodiode 66, placed after the optical filter 56, enables to measure power of the signal composite Pc and of the artificial added noise $P_{add}$ separately, in order to obtain an estimated value of the OPcNR. Optical variable attenuators (VOA) are associated with the switches 53 and 55 in order to control the OPcNR and set it to a level maximally preferred for increasing the sensitivity of the monitor (i.e., comprising such a proportion of noise which causes the maximal "monitorable" change in the Stokes signal and therefore the maximal slope of the sensitivity characteristics). The additional tap photodiode 67 with an associated VOA are placed after the optical amplifier 62

(say, EDFA), in order to control and indicate to the processor 72 the optical power launched into the SBS enhanced medium 64. The proposed technique, owning to introducing the additional artificial noise, drastically increases the sensitivity (the OSNR monitoring range) of the monitor, and offers an ability to tune the OSNR monitoring sensitivity according to the desired OSNR range of search.

By using the proposed new monitor, the determining of the true OSNR of a real optical signal can be done by the following steps:
1) Selecting the channel to be monitored (for example, by means of the tunable optical filter shown in FIG. 2)
2) Switching off the artificial noise source by opening switch 55;
3) Measuring the signal Power composite (Pc) without the artificial noise;
4) Switching off the signal port to exclude the Pc, while Switching on the artificial noise source port,
5) Measuring Padd and varying (regulating) the artificial noise power up to reaching a predetermined desired value of OPcNR calculated by the processing unit;
6) Once the required artificial noise power is reached, switching on the signal port by closing switch 53 in order to combine it with the artificial noise signal;
7) Setting the amplifier output power to the desired power to be launched to the SBS medium;
8) Measuring the back reflected power by the second photodiode;
9) Evaluating the effective (OSNRcomb) of the reflected power by the processing unit,
10) Retrieving the true OSNRreal from OSNRcomb using Equation 4.

Figure 3:
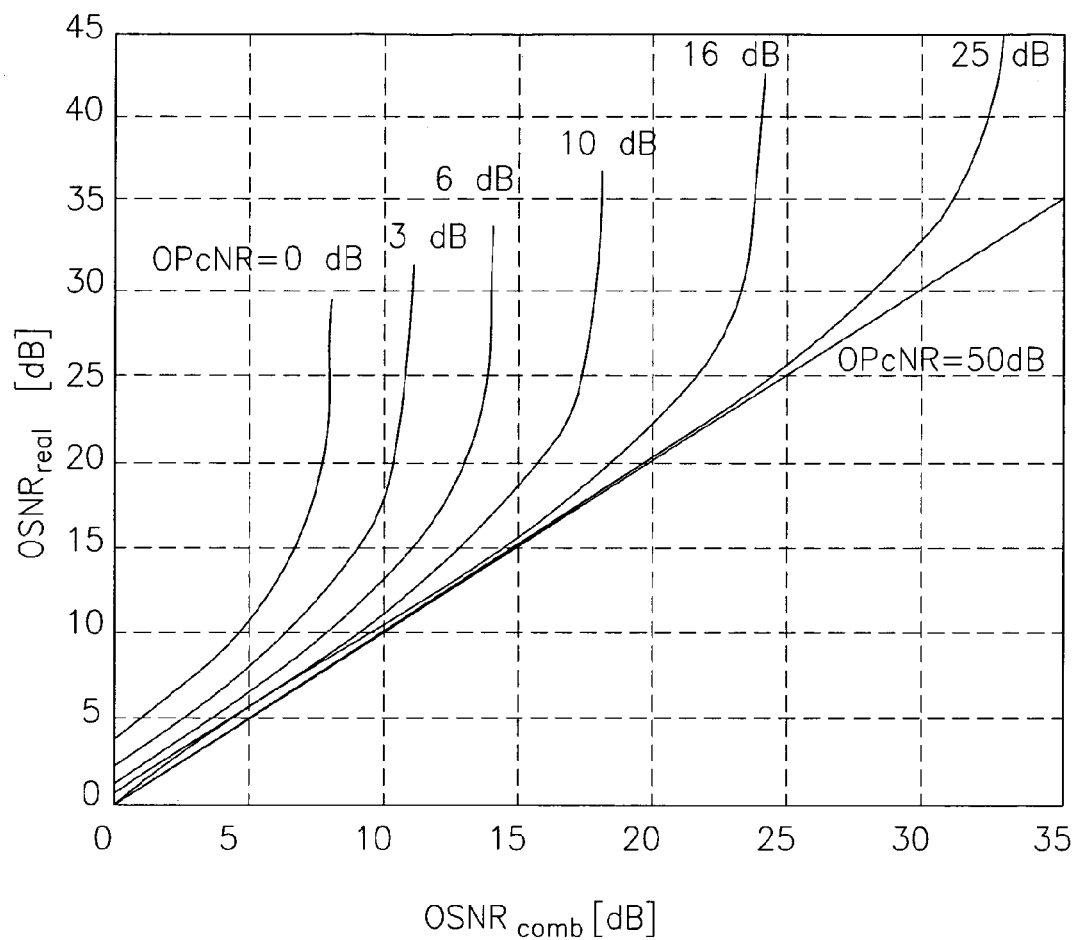
FIG. 3 shows the relationship between the real OSNR and OSNR of the combined signal, for different levels of OPcNR i.e., for different levels of artificial noise.

FIG. 3 shows the relationship between the real OSNR, ($OSNR_{real}$ of a real optical signal) and the OSNR of the combined signal, $OSNR_{comb}$ for different levels of OPcNR, i.e. for different ratios of power of the real optical signal and the introduced artificial (external) noise. Similar tables can be stored in the processing unit 72. For a reference value OPcNR=50 dB, the added external noise is extremely negligible and therefore the measured $OSNR_{comb}$ is identical to the OSNR of the real signal, $OSNR_{real}$. This reference case (the straight diagonal line) is therefore identical to the prior art situation, where no additional external noise is combined to the signal extracted from the network. When the amount of combined noise is increased by adding the external noise, the OPcNR level decreases (see a group of curves to the left of the reference straight line). In this case, $OSNR_{comb} < OSNR_{comb,MAX} < OSNR_{real}$ where $OSNR_{comb,MAX}$ is the upper limit of $OSNR_{comb}$, and it is equal to $P_s/P_{add}*B_{ref}/B_{eq}$ for high $OSNR_{real}$ By reducing the OPcNR level, the operative range of the $OSNR_{comb}$ is shifted toward lower values.

Figure 4A:
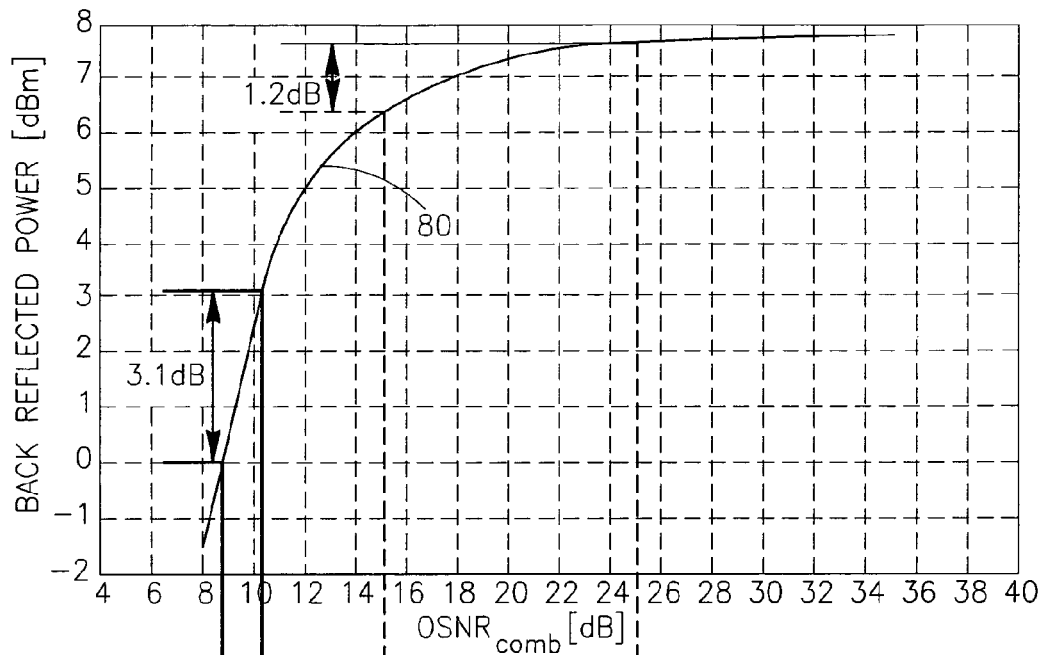
FIGS. 4A, 4B schematically illustrate the improvement of the OSNR sensitivity range between the prior art technique and the proposed OSNR monitor.
Figure 4B:
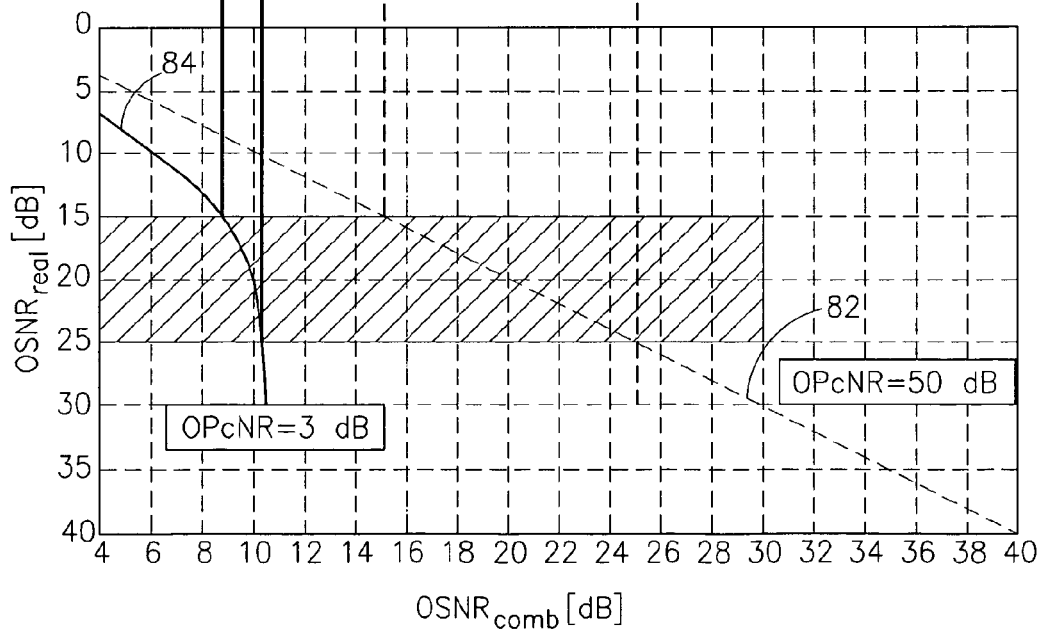

FIGS. 4A, 4B show the principle of operation of the proposed apparatus. The upper graph (FIG. 4A) shows the dependence 80 between the reflected power, measured at 70, and the level of $OSNR_{comb}$. The lower graph (FIG. 4B) shows the relationship between $OSNR_{real}$ and $OSNR_{comb}$ for the case when OPcNR=50 dB (prior art, line 82) and for the case OPcNR=3 dB (line 84). The graph is visually different from that in FIG. 3, since the axis OSNRreal is presented here in the opposite direction. For high bit rates of optical signals in the network, the OSNR ($OSNR_{real}$) range of the signals in the network is usually designed/required to be between 15 and 25 dB (indicated in the drawing as a hatched area). In the case of the prior art method (OPcNR=50 dB, line 82), for such a designed OSNR range, the $OSNR_{comb}=OSNR_{real}$ since no additional noise is introduced to the signal at the monitoring stage. In the upper graph 4A, one can see on line 80 that the prior art technique provides the change in the reflected power of only 1.2 dB for the range of $OSNR_{comb}$ found between 15 and 25 dB.

In contrast with that, the newly proposed technique translates the designed OSNR range (15 to 25 dB) into much more sensible changes in values of the back reflected power (FIG. 4A). For example, when OPcNR is equal to 3 dB, the $OSNR_{comb}$ range moves to 8.5 to 10.2 dB and for such $OSNR_{comb}$ range, the slope of the reflected power is very strong and the OSNR sensitivity range is increased to 3.1 dB. The operating point and the sensitivity of the proposed monitor is essentially increased. The proposed technique and apparatus is essentially more practical for deployment into real optical networks.

FIGS. 5A, B, C, D (prior art) comprise examples of the optical spectra of different modulation formats of the optical signal which have been used for obtaining computer simulations of the inventive technique: FIG. 5A—44.6 Gbps NRZ OOK, FIG. 5B—44.6 Gbps NRZ DPSK, FIG. 5C—44.6 Gbps NRZ DQPSK and FIG. 5D—112 Gbps NRZ DP-QPSK.

The complete titles of the modulation formats are: OOK (On-Off Keying), DPSK (Differential phase shift keying), DQPSK (Differential Quaternary Phase Shift Keying) and DP-QPSK (Dual Polarization Quaternary Phase Shift Keying), NRZ (non return to zero) is the optical line coding of the modulation format.

It should be noted that in comparison with the phase modulated modulation formats, the NRZ OOK signal presents a high peak component at the carrier frequency leading to a much lower SBS threshold; the NRZ OOK signal can therefore be better monitored by the prior art set-up, than other formats. However, all of the formats, should they be monitored by the prior art noise monitor, would require a large bandwidth filter, which is not implementable with 100 and 50 Ghz channel spacing in modern optical networks.

Figure 6A:
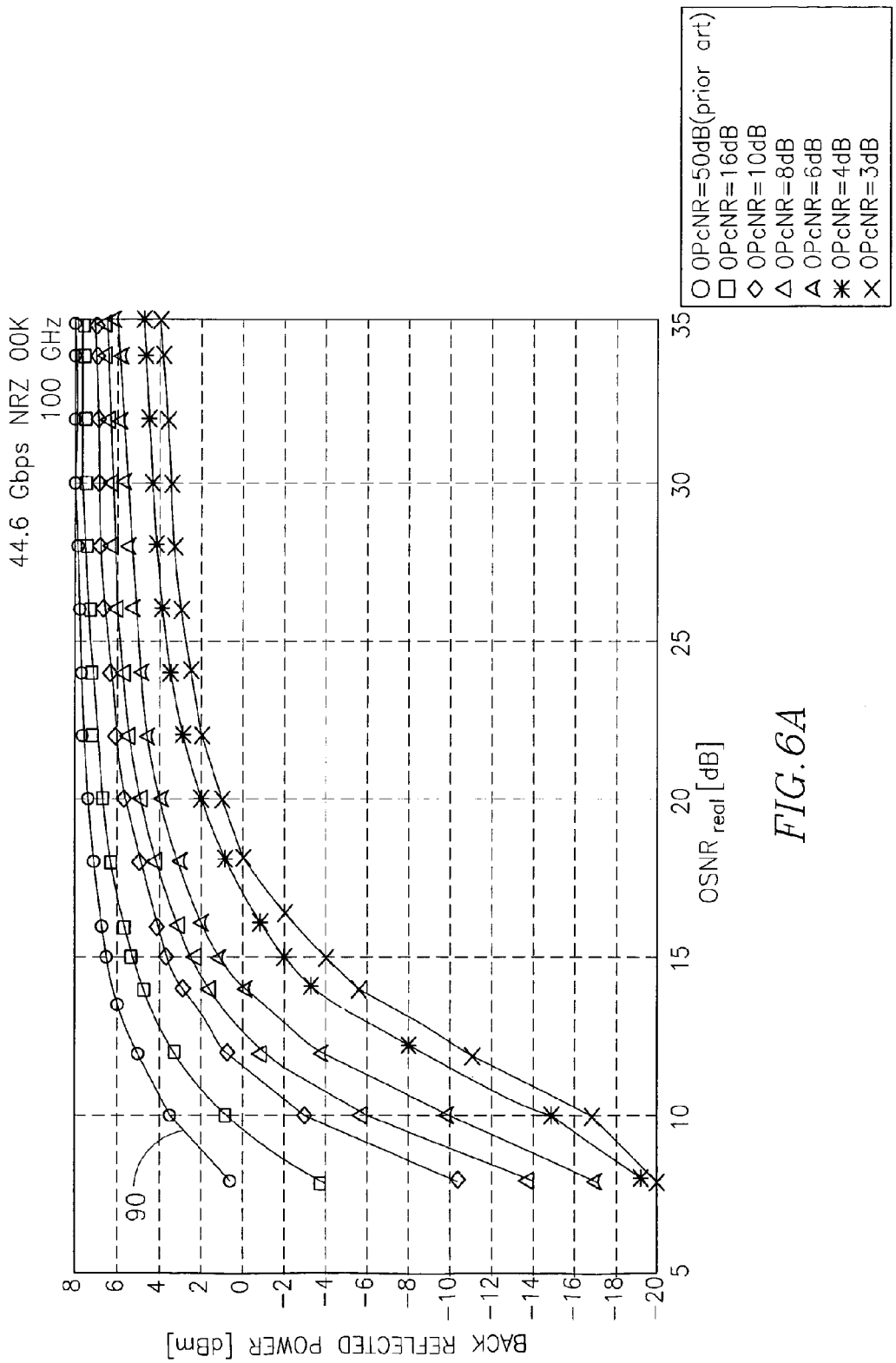
FIG. 6a shows results of a numerical simulation of the back reflected power as a function of the real OSNR for 44.6 Gbps NRZ OOK signal, for several OPcNR levels, in the case of 100 GHz channel spacing.

FIG. 6A shows a group of graphs being numerical simulation results of the back reflected power as a function of the true OSNR of a real optical signal. The graphs of FIG. 6A are built for 44.6 Gbps NRZ OOK signal in a 100 GHz channel spacing network, and for several OPcNR levels. The simulation assumes that the SBS enhanced media is a 3 km-length HNLF with a launched power of 18 dBm.

For WDM networks operating with 100 GHz channel spacing, the optical filter used in the apparatus is supposed to be a $3^{rd}$ order flat top Gaussian filter with 3 dB bandwidth of 80 GHz. NRZ OOK is not the best optimized modulation format for bit rates of 40 Gbps and more, since it requires the designed OSNR to be higher than 18 dB.

The prior art apparatus, where no artificial noise is added to the signal, is demonstrated in FIG. 6A as curve 90 corresponding to OPcNR of 50 dB (the upper slightly curved line). For OSNR varying from 18 dB to 35 dBm, the variation of back reflected power is 0.7 dB only the prior art case. It is to note that in the prior art reference it was reported about broader variations of the back reflected power since they used 1 nm (125 GHz) bandpass filter which, however, cannot be used in optical networks operating at the 100 GHz channel spacing.

In the presently proposed monitoring technique, when reducing the OPcNR by adding the artificial noise to the signal, the $OSNR_{comb}$ of the combined signal gets reduced. At such a low effective OSNR, the slope of the SBS induced back reflected power becomes higher, thus leading to a higher OSNR monitoring sensitivity. The additional curves in FIG. 6A show the dependence of the back reflected power from different OPcNR levels. While decreasing the OPcNR leads to reduction of the back reflected power efficiency, it can be noted that the slope of the back reflected power graphs increases. For OPcNR of 1 dB, the back reflected power increases by 6 dB for $OSNR_{real}$ varying from 18 dB to 35 dBm. This shows the enhancement of the OSNR monitoring sensitivity by 5.3 dB in comparison with the prior art apparatus.

Figure 6B:
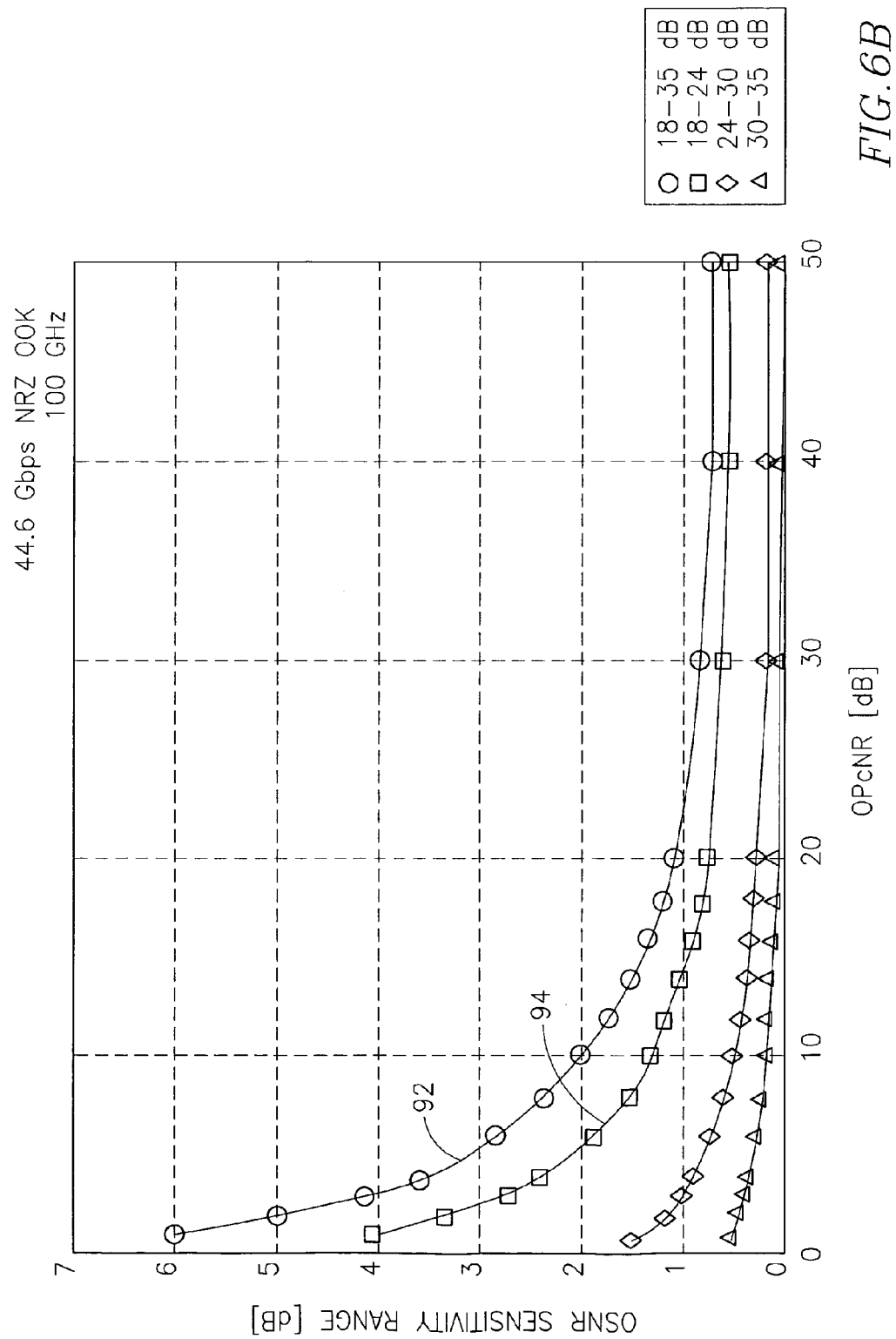
FIG. 6b shows the change in the OSNR monitoring sensitivity as function of the OPcNR, for different OSNR monitoring ranges for 44.6 Gbps NRZ OOK signal with 100 GHz channel spacing.

FIG. 6B shows how the dynamic monitoring range of the OSNR monitor varies as a function of the OPcNR, and depending on the OSNR range of the real optical signal (the exemplary OSNR ranges are indicated at the upper right corner). The figure illustrates graphs for OSNR range of 18-35 dB (and for the OSNR sub-ranges of 18-24 dBm, 24-30 dB and 30-35 dB) for 44.6 Gbps NRZ OOK signal in the 100 GHz channel spacing configuration. In all cases/groups, decrease of the OPcNR (i.e., adding a stronger artificial noise to the optical signal) leads to enhancement of the monitoring sensitivity for all sub ranges of the optical signal's OSNR. The best enhancement is of 6 dB in the OSNR range of 18-35 dB (line 92) and it is obtained for OPcNR of 1 dB. The sub range of 18-24 dB (line 94 corresponding to the typical planned OSNR range in the optical network) exhibits the high OSNR sensitivity range of 4 dB.

Figure 7A:
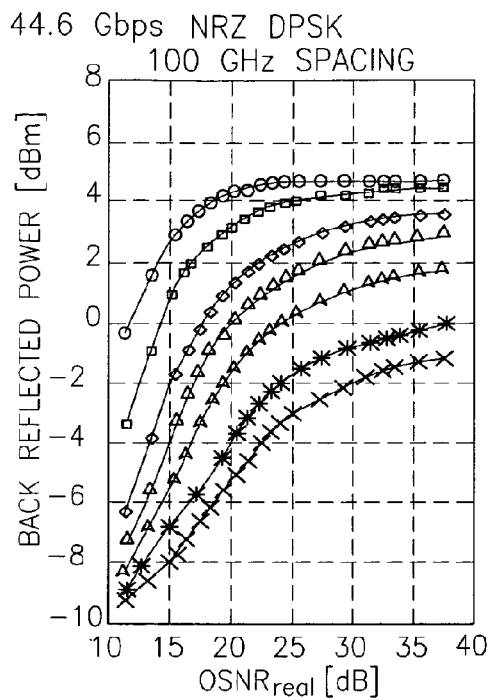
FIGS. 7A, 7B show results of the numerical simulation of the back reflected power as a function of the real OSNR for a 44.6 Gbps NRZ DPSK signal; the simulation is performed for several OPcNR levels, and for 100 GHz and 50 GHz channel spacing.
Figure 7B:
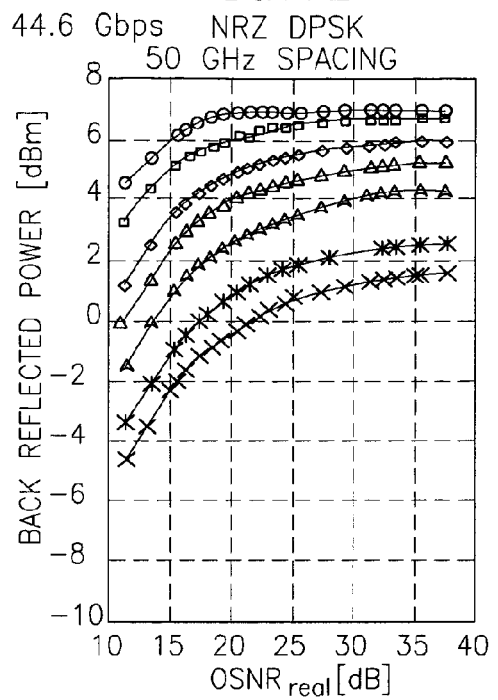

FIGS. 7a, 7B show two groups of graphs being numerical simulation results of the back reflected power as a function of the true OSNR of a real optical signal. Both of the groups are built for 44.6 Gbps NRZ DPSK/partial DPSK signal, and for several OPcNR levels. The left hand group (FIG. 7A) is built for the channel spacing of 100 GHz, and the right-hand group (FIG. 7B) is built for 50 GHz channel spacing, which implies more strict requirements to OSNR of the real optical signal The simulation assumes that the SBS enhanced media is a 3 km-length HNLF with a launched power of 23 dBm.

The prior art apparatus (FIG. 1B), where no artificial noise is added to the signal, is demonstrated in the graphs as the curves corresponding to OPcNR of 50 dB (the upper, slightly curved lines in both groups).

For WDM networks operating with 100 GHz channel spacing, the optical filter used in the apparatus is supposed to be a $3^{rd}$ order flat top Gaussian filter with 3 dB bandwidth of 80 GHz. In the prior art apparatus (the upper lines), for OSNR varying from 15 dB to 35 dBm, the back reflected power changes by 1.9 dB only. When reducing the OPcNR (i.e., when the artificial noise is added to the signal), it reduces also the $OSNR_{comb}$ of the combined signal. At such a low effective OSNR ($OSNR_{comb}$), the slope of the SBS induced back reflected power becomes steeper, thus leading to a higher OSNR monitoring sensitivity. The additional curves show the dependence of the back reflected power (corresponding to a true signal OSNR) from different OPcNR levels. While decreasing the OPcNR leads to reduction of the back reflected power efficiency, it can be noted that the slope of the back reflected power increases. For OPcNR of 6 dB, the back reflected power increases by 6.9 dB for OSNR varying from 15 dB to 35 dBm. This shows the enhancement of the OSNR monitoring sensitivity by 5 dB.

For WDM networks operating with the 50 GHz channel spacing (the right hand group of graphs, FIG. 7B), the optical filter used in the apparatus is supposed to be a $3^{rd}$ order flat top Gaussian filter with 3 dB bandwidth of 45 GHz. In this case, because of the reduced filter bandwidth, the amount of the allowed in band noise power is much lower than in the case of 100 GHz channel grid. Therefore the variation in the efficiency of the SBS induced reflected power is reduced compared to the case of 100 GHz channel spacing in the prior art apparatus (FIG. 1B and the upper graphs in FIGS. 7A, 7B), for OSNR varying from 15 dB to 35 dBm, the back reflected power increases by 0.9 dB only. Here again, addition of the local artificial noise leads to an increase of the OSNR monitoring efficiency and say, for OPcNR of 3 dB, the back reflected power varies already by 3.6 dB. This shows the enhancement by 2.7 dB with respect to the prior art apparatus.

Figure 7C:
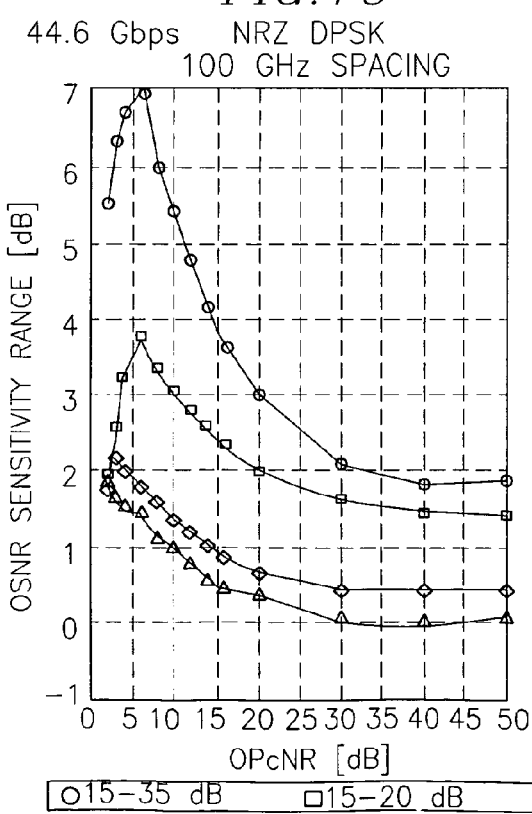
FIGS. 7C, 7D show the changes in the OSNR monitoring sensitivity as a function of the OPcNR, for different OSNR monitoring ranges and for the same signal of 44.6 Gbps NRZ DPSK with 100 GHZ and 50 GHz channel spacing respectively.
Figure 7D:
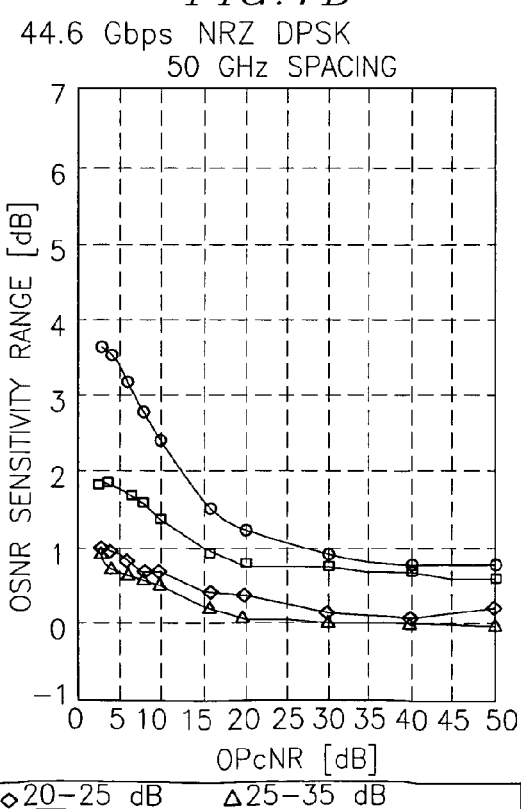

FIGS. 7C and 7D are built for FIGS. 7A and 7B respectively. FIGS. 7C and 7D show how the dynamic monitoring range of the OSNR monitor varies as a function of the OPcNR, and depending on the OSNR range of the real optical signal. Both of the spacing groups illustrate graphs for OSNR range of 15-35 dB and for the OSNR sub-ranges of 15-20 dBm, 20-25 dB acid 25-35 dB, in the case of 44.6 Gbps DPSK/partial DPSK. In both cases/groups, decrease of the OPcNR (i.e., adding a stronger artificial noise to the optical signal) leads to enhancement of the monitoring sensitivity for all sub ranges of the optical signal's OSNR. The sub range of 15-20 dB (corresponding to the typical planned OSNR range in the optical network) exhibits the best OSNR sensitivity range of 3.7 dB and 1.6 dB for 100 and 50 GHz channel spacing respectively.

Similarly, FIGS. 8A, 8B, 8C, 8D illustrate applicability and efficiency of the proposed monitoring technique for optical signals modulated according to the NRZ DQPSK modulation format.

Also, FIGS. 9A, 9B, 9C, 9D, show efficiency of the proposed method for optical signals modulated according to the NRZ DP-QPSK modulation format.

It should be noted that Both of the above-mentioned formats cannot be monitored by the prior art technology (FIG. 1B), while are successively monitored by the new technique.

More specifically, FIGS. 8A and 8B show two groups of graphs being numerical simulation results of the back reflected power as a function of the true OSNR of a real optical signal, in the case of 44.6 Gbps NRZ DQPSK and for several OPcNR levels. The left hand group is built for the channel spacing of 100 GHz, and the right-hand group is built for 50 GHz channel spacing, which implies more strict requirements to OSNR of the real optical signal. The simulation assumes that the SBS enhanced media is a 3 km-length HNLF with a lunched power of 23 dBm. For OPcNR of 50 dB (prior art case), the reflected power varies by 5.8 dB and 1 dB for 100 and 50 GHz channel spacing respectively (for the $OSNR_{real}$ range from 15 to 35 dB). When decreasing the OPcNR level, the variations in the reflected power become stronger. As shown in FIG. 8C, the optimum OSNR sensitivity range is 10.2 dB and is obtained for OPcNR=10 dB in the case of 100 GHz channel spacing. For networks operating with 50 GHz channel spacing (FIG. 8D), the OSNR sensitivity range is enhanced up to a level of 3.3 dB, for OPcNR=3 dB.

Similarly, FIGS. 9A and 9B show two groups of graphs being numerical simulation results of the back reflected power as a function of the true OSNR of a real optical signal, in the case of 112 Gbps, NRZ DP-QPSK and for several OPcNR levels. The left hand group (FIG. 9A) is built for the channel spacing of 100 GHz, and the right-hand group (FIG. 9B) is built for 50 GHz channel spacing. The simulation assumes that the SBS enhanced media is a 3 km-length HNLF with a launched power of 23 dBm. DP-QPSK modulation format comprises two signals QPSK at the same wavelength but multiplexed with orthogonal polarization. When propagating into the HNLF, both QPSK signals generate back reflected power independently, without any coupling between the two back reflected signal since they keep the polarization orthogonality property [9]. For OPcNR of 50 dB (the prior art case, the upper curves in FIGS. 9A and 9B), the reflected power varies by 4.5 dB and 0.8 dB for 100 GHz and 50 GHz channel spacing respectively (for $OSNR_{real}$ range from 15 to 35 dB). When decreasing the OPcNR level, the variations in the reflected power become stronger. As shown in FIG. 9C, the optimum OSNR sensitivity range is 7.5 dB and is obtained for OPcNR=10 dB in the case of 100 GHz channel spacing. For networks operating with 50 GHz channel spacing, the OSNR sensitivity range is enhanced to a level of 3 dB for OPcNR=1 dB (FIG. 9D).

Other modulation formats, which can be used with the proposed method in real networks at high bit rates (>40 Gbps), are for example:
OFDM-Orthogonal Frequency Division multiplexing;
QAM-Quadrature Amplitude Modulation (such as QAM 16, QAM 64, QAM 128, QAM 256);
DuoBinary; RZ—Return to zero modulation; CS-RZ—Carrier Suppressed Return to Zero; CRZ—Chirped RZ; SSB—Single Side Band modulation.
Also, the Dual Polarization (DP) of the above modulation formats can be used in real networks.

It should be emphasized, that the proposed technique is novel and non-obvious over the closest prior art reference WO 2008151384 A1, since contrary to the prior art apparatus, the proposed arrangement intentionally adds external noise power to the signal to be monitored and strongly distorts the signal, which was never considered as an option in the prior art. The intentional adding of external noise leads to the enhanced difference in the SBS back reflected power and to the significant increase in the OSNR monitoring sensitivity, which is very crucial for signals used in optical networks with high speed modulation formats at 10, 40 and 100 Gbps. It should be reminded, that a real optical signal in such networks cannot have OSNR lower than 15 dB i.e., it may include only a low level of in-band noise power; The proposed approach works well also for lower bit rates, for example 2.5 Gbps, 10 Gbps, 20 Gbps, and becomes the only enabling technique where very small channel spacing like 25 GHz or 12.5 GHz are required at such bit rates.

the proposed arrangement is compliant with many types of modulation formats which are used in modern optical networks. The prior art technique is limited to specific formats and to low bit rate signals.

the new technique proposes a; new feature for deriving the true OSNR of the "distorted/altered" signal using its "distorted/altered" OSNR ($OSNR_{comb}$). Namely, knowing the OPcNR and the effective OSNR of the altered signal ($OSNR_{comb}$), the new technique allows obtaining a correct estimate of the original signal's $OSNR_{real}$ (e.g., using the proposed Equation 4).

It should be appreciated that other versions of the new method and other embodiments of the new monitor could be proposed and should be considered part of the invention whenever defined by the general claims which follow.

The invention claimed is:

1. A method for determining an OSNR ($OSNR_{real}$) of a real optical signal being carried in an optical network link, the method comprising:
    tapping a portion of the real optical signal;
    altering the tapped signal portion by adding to it an in-band artificial noise signal, thus obtaining a combined signal;
    scattering the combined signal by a stimulated Brillouin scattering (SBS) or a stimulated Raman scattering (SRS) in an optical element;
    extracting a signal back reflected by the SBS or the SRS from the optical element;
    determining an $OSNR_{comb}$ of the combined optical signal based on power of the reflected optical signal; and
    deriving the $OSNR_{real}$ from the $OSNR_{comb}$ by taking into account information on power of the added artificial noise,
    wherein the $OSNR_{real}$ is derived substantially according to the following equation:

$$OSNR_{real}=OSNR_{comb}\times(OPcNR+1)/(OPcNR-OSNR_{comb}\times(B_{ref}/B_{eq})),$$

where OPcNR=Pc/Padd, Pc is power of the real optical signal, Padd is power of the added artificial noise, and $B_{ref}/B_{eq}$ is a coefficient.

2. The method according to claim 1, comprising regulating power of said portion of the real optical signal and/or power of said added artificial noise signal and selecting such a proportion there-between which maximally increases sensitivity of the optical element.

3. The method according to claim 1, comprising amplifying the altered signal to a power suitable for scattering to the optical element.

4. The method according to claim 3, wherein said amplifying is performed only during a fraction of the signal time frame, by switching off said signal during a complementary fraction of the time frame.

5. The method according to claim 1, wherein the real optical signal is a signal modulated according to one of the formats selected from the following non-exhausting list: OOK (On-Off Keying), PSK (Phase Shift Keying), DPSK (Differential phase shift keying), QPSK (Quaternary Phase Shift Keying), DQPSK (Differential Quaternary Phase Shift Keying), OFDM (Orthogonal Frequency Division multiplexing), QAM (Quadrature Amplitude Modulation), DuoBinary, SSB (Single Side Band) modulation, and wherein any of said formats is applicable in NRZ (non Return to Zero) and RZ (Return to Zero) optical line coding versions, and in Dual Polarization version.

6. The method according to claim 1, wherein the power of the artificial noise is Padd, and the relative power of the artificial noise is OPcNR=Padd/Pc, wherein Pc is power of the real optical signal tapped from the optical network.

7. An OSNR monitor for monitoring an $OSNR_{real}$ of a real optical signal being carried in an optical network link and including an in-band Amplified Spontaneous Emission (ASE) noise, the monitor comprising:
    a receiver for receiving at least a portion of said real optical signal from said link;
    a source of artificial noise, for adding an artificial noise signal to the portion of said real optical signal;
    a coupling device for coupling said at least a portion of the optical signal and said artificial noise signal, thus obtaining a combined signal;
    an optical element to scatter said combined signal by a stimulated Brillouin scattering (SBS) or a stimulated Raman scattering (SRS);
    a device for extracting a reflected optical signal comprising a portion of said combined optical signal back-reflected by the SBS or the SRS in said optical element;
    a photodetector for receiving and measuring power of said reflected optical signal; and
    a processing unit for determining the $OSNR_{real}$ of the real optical signal,
    wherein said processing unit is configured to determine an $OSNR_{comb}$ of the combined optical signal based on power of the reflected optical signal, and configured to derive the $OSNR_{real}$ from the $OSNR_{comb}$ by taking into account information on power of the added artificial noise, and wherein the processing unit is further configured to derive the $OSNR_{real}$ substantially according to the following equation:

$$OSNR_{real} = OSNR_{comb} \times (OPcNR+1)/(OPcNR - OSNR_{comb} \times (B_{ref}/B_{eq})),$$

where $OPcNR = Pc/Padd$, $Pc$ is power of the real optical signal, $Padd$ is power of the added artificial noise, and $B_{ref}/B_{eq}$ is a coefficient.

8. The OSNR monitor according to claim 7, wherein the processing unit is configured to determine the $OSNR_{real}$ upon two or more measurements based on different powers of the added artificial noise signal, and averaging the obtained values of the $OSNR_{real}$.

9. The OSNR monitor according to claim 7, configured for highly sensitive monitoring of the real optical signal being a wavelength-division multiplexing (WDM) optical signal having bit rate 40 Gbps or higher, carried in a WDM network having channel spacing not wider than 100 GHz.

* * * * *